(12) United States Patent
Roganti et al.

(10) Patent No.: US 6,188,571 B1
(45) Date of Patent: Feb. 13, 2001

(54) HIGH DENSITY RAID SUBSYSTEM WITH HIGHLY INTEGRATED CONTROLLER

(75) Inventors: Adriano Roganti, Margate; Thomas Wille, Lake Worth; Ronald Bruce Smith; Jose Platon Basco, both of Wellington, all of FL (US)

(73) Assignee: Aiwa Raid Technology, Inc., Boca Raton, FL (US)

( * ) Notice: Under 35 U.S.C. 154(b), the term of this patent shall be extended for 0 days.

(21) Appl. No.: 08/963,841

(22) Filed: Nov. 3, 1997

(51) Int. Cl.[7] .................................................. G06F 1/16
(52) U.S. Cl. ..................... 361/685; 361/724; 361/727; 395/183.2
(58) Field of Search .................................. 361/685, 687, 361/724–727; 364/708.1; 395/183.2, 184.01, 800.16

(56) References Cited

U.S. PATENT DOCUMENTS

| | | | |
|---|---|---|---|
| 5,247,427 | * | 9/1993 | Driscoll et al. ...................... 361/685 |
| 5,297,067 | * | 3/1994 | Blackborow et al. ............. 364/708.1 |
| 5,604,662 | * | 2/1997 | Anderson et al. .................... 361/685 |
| 5,619,486 | * | 4/1997 | Uno et al. .............................. 361/685 |
| 5,712,761 | * | 1/1998 | Dials et al. ........................... 361/685 |
| 5,761,033 | * | 6/1998 | Wilhelm ................................ 361/725 |
| 5,765,012 | * | 6/1998 | Wilkinson et al. ............. 395/800.16 |
| 5,784,644 | * | 7/1998 | Larabell ................................ 361/685 |
| 5,822,184 | * | 10/1998 | Rabinovitz ........................... 361/685 |
| 5,966,510 | * | 10/1999 | Carbonneau et al. ............ 395/183.2 |

* cited by examiner

*Primary Examiner*—Gregory Thompson
*Assistant Examiner*—Lisa Lea-Edmonds
(74) *Attorney, Agent, or Firm*—David B. Abel; Squire, Sanders & Dempsey L.L.P.

(57) ABSTRACT

The present invention provides a method and apparatus for a mass storage subsystem such as a RAID array. The invention includes a housing which defines first and second cavities with the first cavity housing an array controller such as a RAID controller. The second cavity houses a plurality of substantially conventional IDE drives conforming to the 3.5" form factor. The array is configured to maximize cooling of the array controller and the drives within the extremely small space defined by the housing.

2 Claims, 18 Drawing Sheets

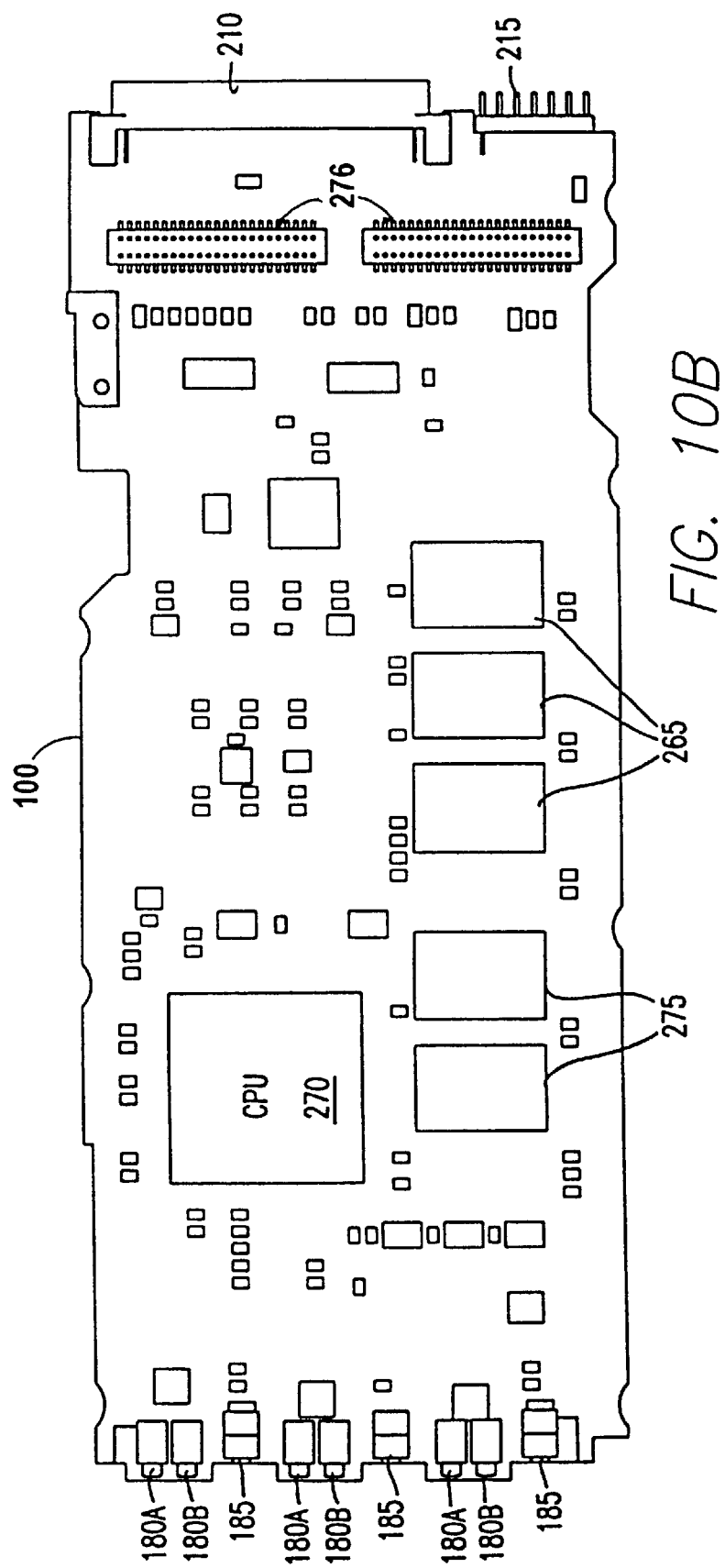

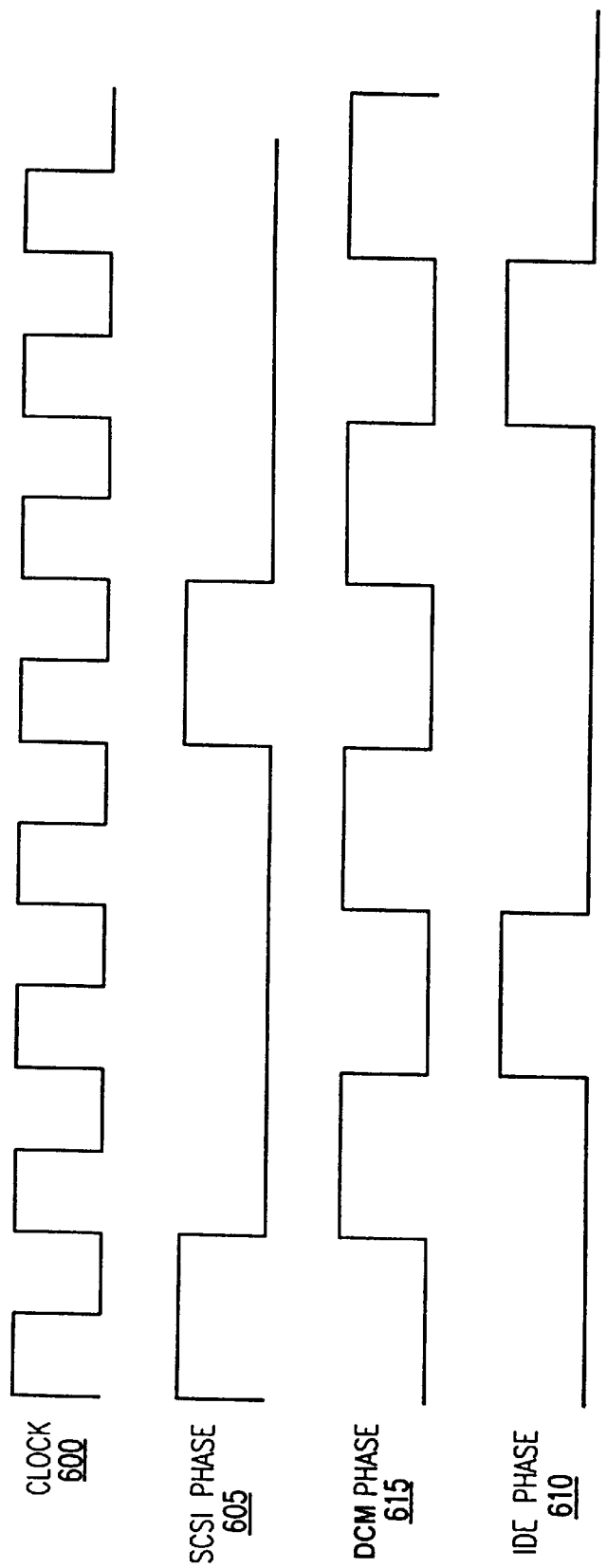

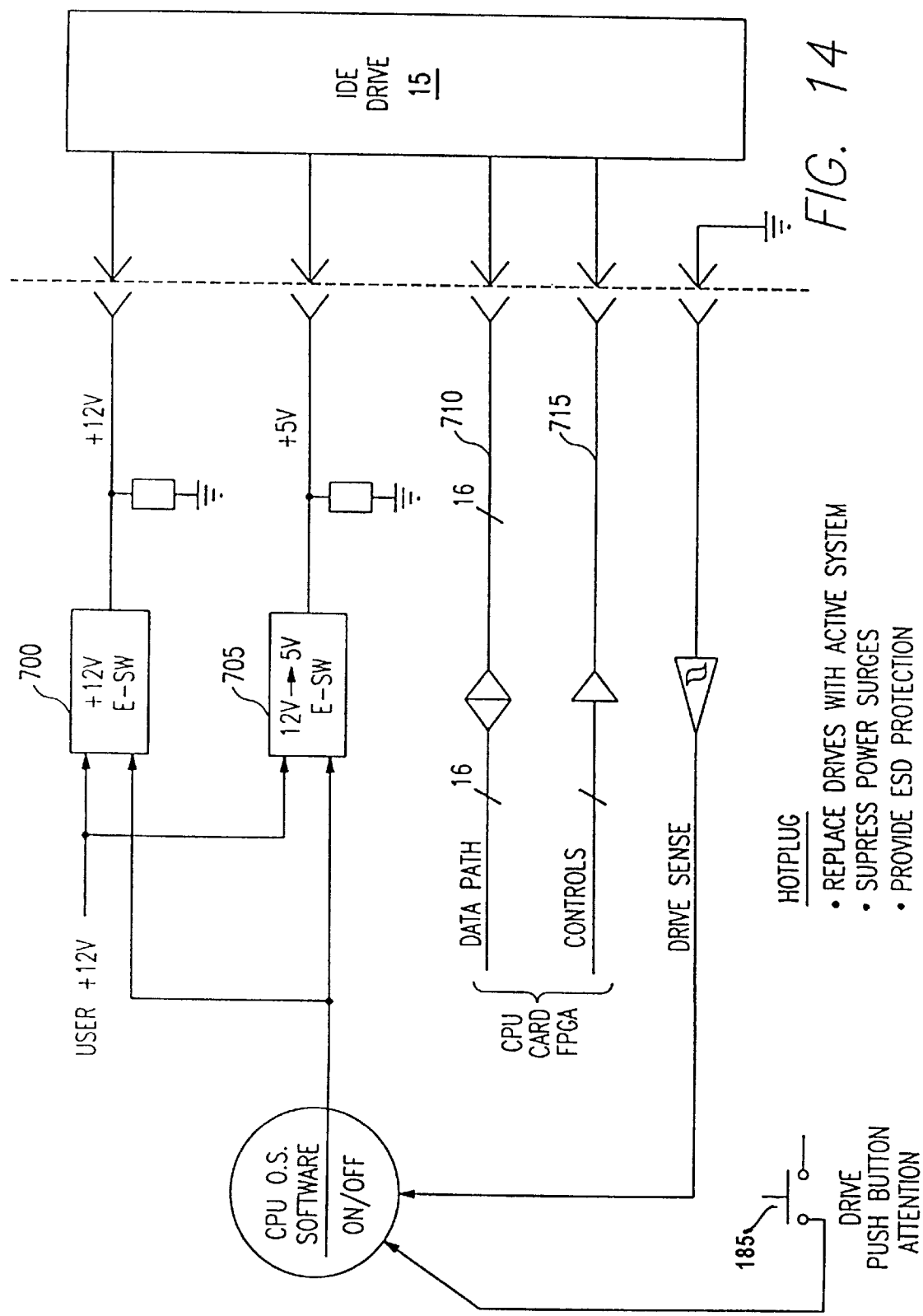

HIGH DENSITY RAID SUBSYSTEM WITH HIGHLY INTEGRATED CONTROLLER

FIELD OF THE INVENTION

The invention relates to disk drives, and more particularly to RAID array subsystems and controllers.

BACKGROUND OF THE INVENTION

Hard disk storage has become ubiquitous for virtually every personal computer and server, as well as many other related types of systems. In many instances, such storage represents the only repository for mission-critical information for at least the time between backups. As a result, these storage devices must be highly reliable and maintain extremely high data integrity.

Many types of storage subsystems have been developed to ensure against data corruption, including mirrored drives, failover systems, and multiply redundant drive subsystems. A form of multiply redundant subsystem which has become particularly well-regarded for its high reliability is the "redundant array of inexpensive drives," or RAID subsystem.

RAID subsystems typically have been implemented in servers and other computer systems. In general, RAID subsystems include two or more disk drives (typically of the same capacity, and frequently of the same type) and, in at least some forms of RAID implementations, are configured such that each drive serves as the primary storage device for a first portion of the data stored on the subsystem and serves as the backup storage device for a second portion of the data. Various backup schemes for RAID systems have been developed, including RAID 0, RAID 1, and RAID 5. In RAID 0, no data redundancy is provided, and the capacity of the RAID array is simply the sum of the capacities of the individual drives. In RAID 1, each drive is backed up by an associated drive much like mirrored drives. RAID 1 is implemented in most instances with even numbers of drives. RAID 5, on the other hand, can be implemented by a varying number of drives, typically beginning at a minimum of three (two drives would simply degrade to RAID1.) For a five-disk RAID 5 subsystem, each drive serves as primary storage for 80% of its capacity, and secondary storage for 20% of its capacity. As a result, the storage capacity of such an array is 80% of the sum of the capacities of the drives.

In general, prior art RAID subsystems have been external to the server. This has imposed space and reliability issues, among other things. Conventional sizes of PC cases typically offer only a very limited number of bays for disk storage, and conventional RAID arrays are simply too large to fit the available space. This imposes the requirement for extra floor space in what is typically already a crowded area, but also imposes the requirement for an external cable to connect the server or other PC to the RAID device. One of the more common causes of failures for external devices is cable failure, often due to human error in bumping or inadvertently disconnecting the cable.

In some instances, for example some models of the HP NetServer line, oversized cases have been provided which provide extra bays for storage devices. For example, the NetServer LM product includes a double-wide case with a RAID controller inserted into an expansion slot of the server and a stack of eight bays for drives conforming to the 3.5" form factor. However, this solution obviously requires buying a specific vendors specific model of server and thus limits the user's options. Moreover, the RAID controller occupies an expansion slot which might otherwise be available for other devices. These constraints of the prior art have left those wishing to include RAID subsystems in their existing servers with very limited options.

The assignee of the present invention has previously attempted to resolve some aspects of the dilemma presented to end-users attempting to include RAID subsystems in their existing servers. For example, Aiwa/Core's MicroArray is a RAID subsystem configured to fit within the 5.25" full height form factor. This permits the subsystem to be installed within most existing cases and therefore avoids the footprint and external connection issues of other prior art. The MicroArray product permits a plurality of IDE disk drives (up to five) conforming to the 2.5" form factor to be inserted into the subsystem. The MicoArray product includes within its 5.25" form factor the RAID controller and related electronics necessary to interface the IDE drives to the RAID controller and to provide an external SCSI interface to the host system.

While the MicroArray product offered many advantages over existing prior art, it did have some drawbacks. One significant drawback was that it required the use of expensive 2.5" disk drives, which typically offer far less capacity and less reliability than drives conforming to the 3.5" form factor while at the same time costing significantly more. Because of these limitations, 2.5" drives have typically found a market only in laptop applications, while most desktop applications have used 3.5" drives.

In addition, the RAID controller of the MicroArray product offered limited throughput compared to that available in other devices today and comprised a complicated—and therefore expensive—design. The controller implemented substantially conventional wisdom and offered independent I/O channels for each of the drives in the array. This imposed significant space requirements which prevented the use of any drive larger than those complying with the 2.5" form factor.

As a result there has been a need for a RAID subsystem which is capable of fitting with a 5.25" full height bay of a conventional server case, while at the same time offering an integrated controller within that space and the use of low-cost, high capacity 3.5" drives.

SUMMARY OF THE INVENTION

The present invention describes a RAID subsystem which substantially improves upon the prior art in offering substantially improved capacities, improved throughput, higher reliability, and lower cost while still fitting within a single 5.25" full height bay. The RAID subsystem of the present invention includes the use of a plurality of 3.5" disk drives using the EIDE interface, while at the same time offering the Ultra-SCSI interface to the host system with its desirable high-speed data transfer rate.

To achieve the foregoing, careful management of the mechanical and electrical interfaces has been required—both between the individual drives in the array and the controller, and between the subsystem and the host—to fit the desired capabilities within a tightly limited space. In addition, careful thermal management has been required because of the very limited availability of space for airflow within the subsystem. Finally, the foregoing requirements substantially prohibit the use of conventional controller designs, such that a highly integrated RAID controller has been developed as part of the present invention. The controller of the present invention has the additional feature of offering substantial benefits in areas outside the mechanical design of the present RAID subsystem.

In addition to the mechanical, electrical and thermal problems described above, the present invention is intended to permit ease of maintenance by the end user, which imposes the additional requirement of permitting the end user to have easy access to the drives integrated into the subsystem. This has been achieved by permitting the end-user to remove the front panel of the subsystem, which allows the end-user to remove one or more of the drives in the manner described in U.S. patent application Ser. No. 08/931,766, filed on Sep. 16, 1997 and entitled Disk Drive Latch, assigned to the assignee of the present invention and incorporated herein by reference. At the same time, the end-user's desire for information on the operation of each drive substantially demands that status and access information be delivered to at least the front panel of the subsystem. While the most reliable method for providing such information to the user is by integrating LEDs or other display devices into the printed circuit board on which the RAID controller is mounted, implementing such a design also imposes the limitation that the end user may also be able to touch at least an edge of that printed circuit board. This results in the requirement that the controller board be protected from significant amounts of electrostatic discharge, or ESD, in the event the end-user does not take adequate precautions while accessing the interior of the subsystem.

As noted previously, the controller of the present invention is subject to multiple design constraints not generally found within the prior art. Included in these are space limitations, in that the space available within the form factor for the controller board simply does not permit the use of conventional controller designs. Second, the thermal requirements imposed by the form factor reinforce that conventional controller designs are unacceptable as generating excessive heat. Third, cost requirements make the use of multiple controllers undesirable.

As a result, a highly integrated RAID controller has been developed in which a single I/O channel is provided for use by the SCSI host functions and the drives included within the array, as well as for DMA functions. The single I/O channel is time-multipexed to permit each drive to access the controller for a prespecified, finite period, and also to permit the SCSI host portion of the interface to access the controller for a similar prespecified finite period. By the use of suitable clocking rates, the single-chip controller can thus attend to each of its required functions while at the same time managing the requisite DMA functions. In one embodiment, the engine of the controller may be implemented in an off-the-shelf field programmable gate array, or FPGA, although the design may also be implemented in an ASIC or other similar device. While the controller of the present invention is shown herein used with internal RAID subsystems, the design has application for both internal and external RAID subsystems and may also have application entirely outside the RAID environment.

In addition, the array of the present invention permits hot-swapping of disk drives maintained within the array. Activation of a drive-specific switch accessible to the user causes the firmware of the system to power down the drive. The drive may then be removed and a replacement drive installed. The firmware then automatically senses the installation of the new drive, and reapplies power as well as reconnecting data and control signals. The technique allows maintenance to be performed without down time or loss of data, suppresses power surges and provides protection from electrostatic discharges.

These and other features of the present invention will be better appreciated from the following Detailed Description of the Invention, taken in conjunction with the attached Figures.

BRIEF DESCRIPTION OF THE DRAWINGS

FIG. 10B shows in layout form the second side of the RAID controller board.

FIG. 13 shows the timing of various operations of the RAID engine shown in FIG. 11.

FIG. 14 shows in schematic form the hot-swap capability of the RAID array.

DETAILED DESCRIPTION OF THE INVENTION

Figure 1:
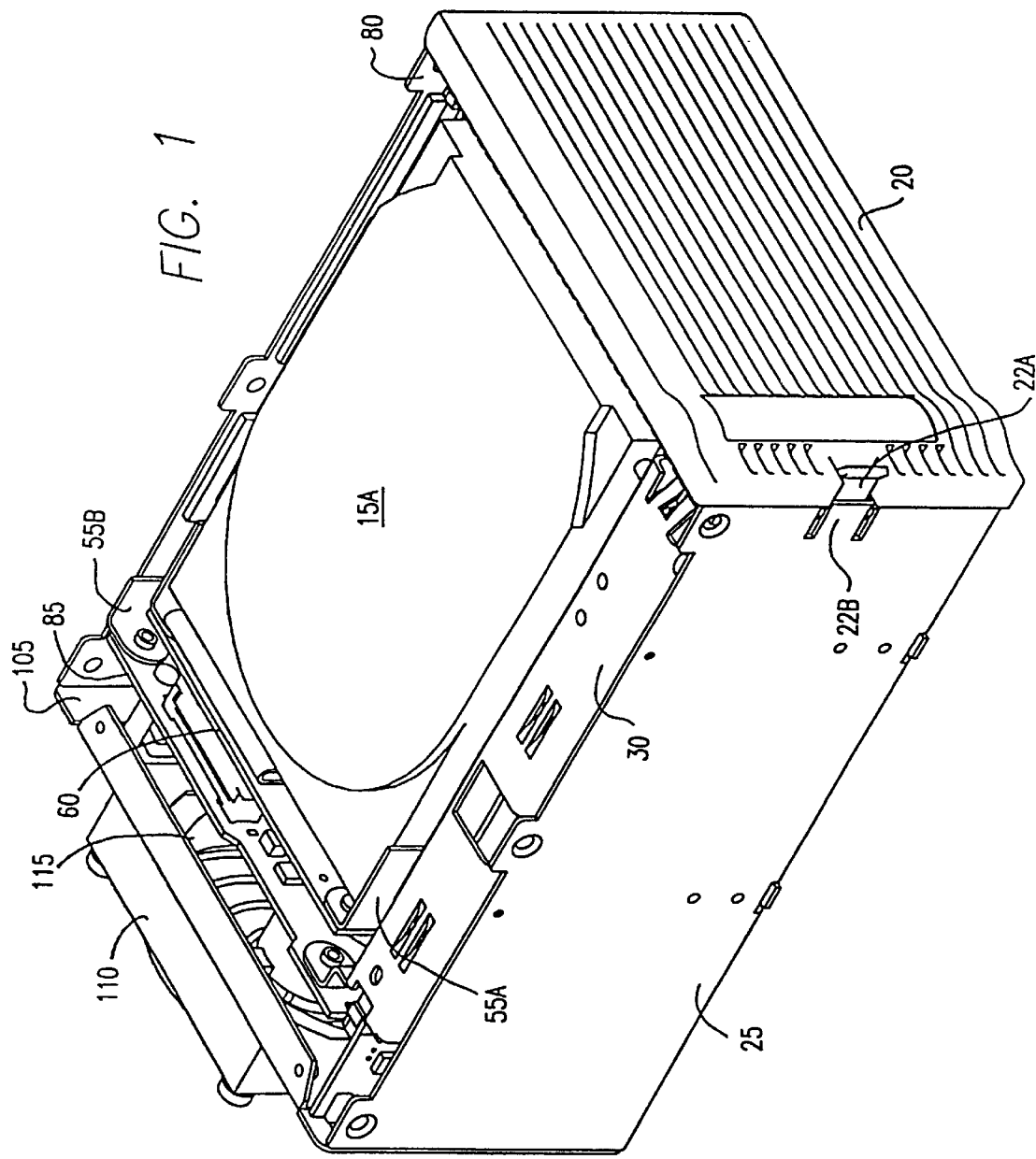
FIG. 1 shows in front three-quarter perspective view the RAID subsystem of the present invention with the top cover removed.
Figure 2:
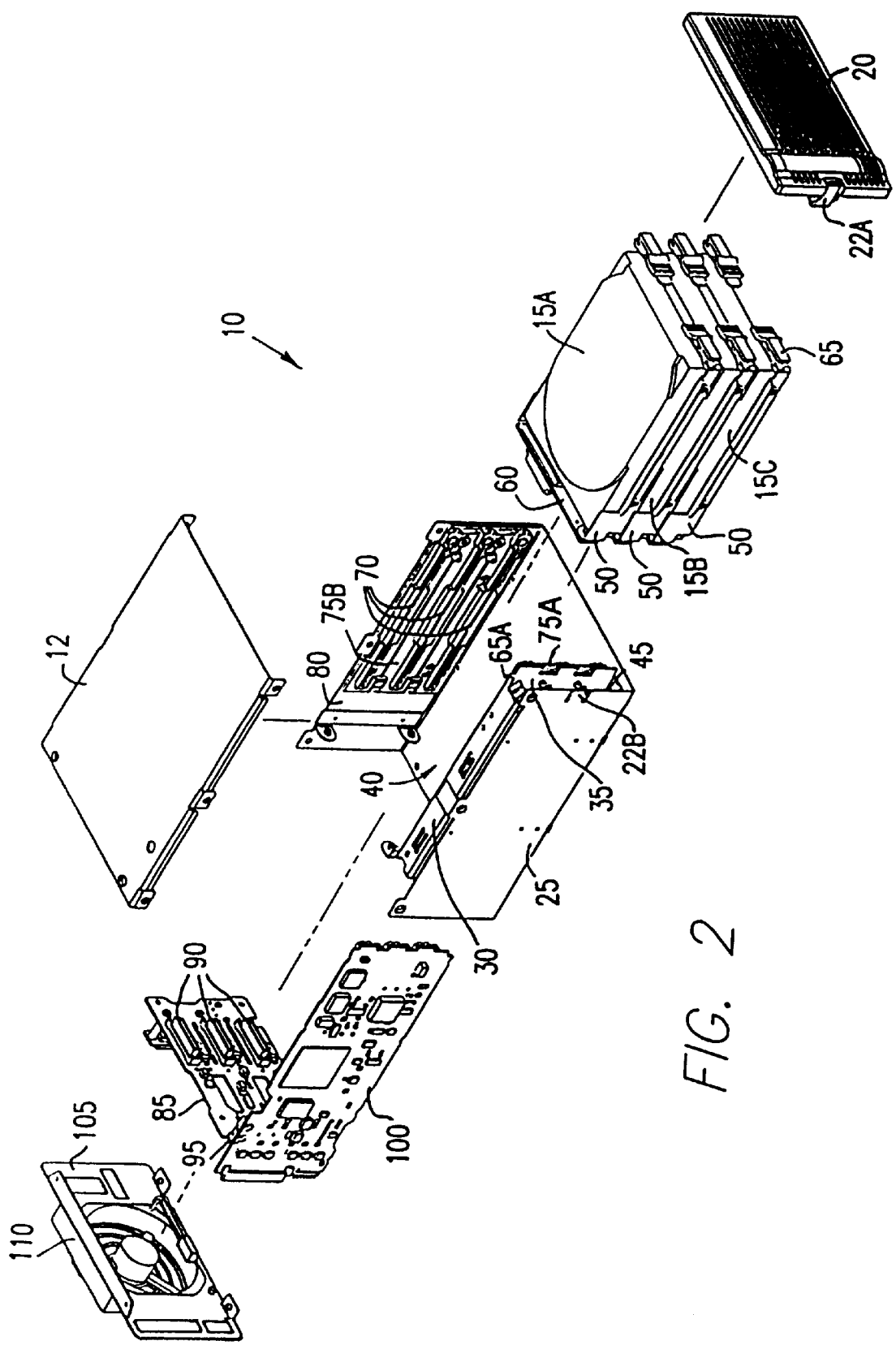
FIG. 2 shows in exploded front three-quarter perspective view the various components of the subsystem of the present invention.

Referring generally to FIGS. 1 through 8, and particularly to FIGS. 1 and 2, the RAID subsystem 10 of the present invention can be better appreciated. As will be appreciated better hereinafter, the top cover 12 of the subsystem has been removed in FIG. 1 but is evident in FIG. 2. A plurality of conventional IDE compliant disk drives 15A, 15B and 15C (where IDE includes within its general scope EIDE and Ultra DMA drives), each of which also complies with the accepted 3.5" form factor, are mounted behind a front bezel 20 and within a case 25. The case 25 cooperates with the bezel 20 to fit within the conventional 5.25" full height form factor, which is generally accepted as approximately 5.25" wide by 3.25" high. A latch 22A, formed integrally with the bezel 20 and mated to a receiver 22B in the case 25, cooperates with L-shaped posts (not shown) on the inside of the opposite end of the bezel which engage the inside of the case 25 to permit the bezel to be unlatched, swung out and removed for maintenance. The length of the form factor is less tightly controlled but is generally on the order of eight to ten inches. An internal top plate and internal side wall 35 are rigidly affixed to the case 25 to define a first cavity 40 suitable for mounting the 3.5" drives 15A–C. The top plate 30 and side wall 35 also enclose a second, long, narrow cavity 45 to the left of the first cavity 40, the use of which is discussed in greater detail hereinbelow.

Each drive 15A–C is mounted within a U-shaped drive bracket 50 (best seen in FIGS. 8 and 9 and described in detail in connection therewith) which comprises a pair of rails 55A–B and a drive extension board 60. A mounting mechanism 65 is mounted on the rails 55A–B, which mechanism is better described in U.S. patent application Ser. No. 08/931,766, filed on Sep. 16, 1997 and entitled Disk Drive Latch, referred to hereinabove and incorporated herein by reference. The rails 55A–B slidably fit within grooves 70 in matching mounting plates 75A–B (best seen in FIGS. 2 and 4), which are affixed to the interior of the right sidewall 80 of the case 25 and the right face of the internal sidewall 35.

Positioned behind the drive extension boards 60 associated with each of the drives 15A–C is a backplane 85, described hereinafter in connection with FIGS. 6 and 7. The backplane 85 includes a plurality of connectors 90 (shown particularly in FIG. 2 and FIG. 7) to mate with a matching connector 90A on each of the drive extension boards, and also includes a connector 95 (best seen in FIGS. 6 & 7) for mounting to a RAID controller printed circuit board 100 mounted within the cavity 45 down the left side of the case 25. A rear cover plate 105 is affixed to the rear of the case 25 to enclose the backplane 85 and the back edge of the RAID controller board 100, and supports a fan 110. The rear cover plate 105 is spaced behind the backplane 85 to form a plenum chamber 115 to permit the fan to cool efficiently the RAID controller board 100 and the drives 15A–C in the tight spacing imposed by the case 25. Other details of the various elements mentioned above will be described in connection with other Figures.

Figure 3:
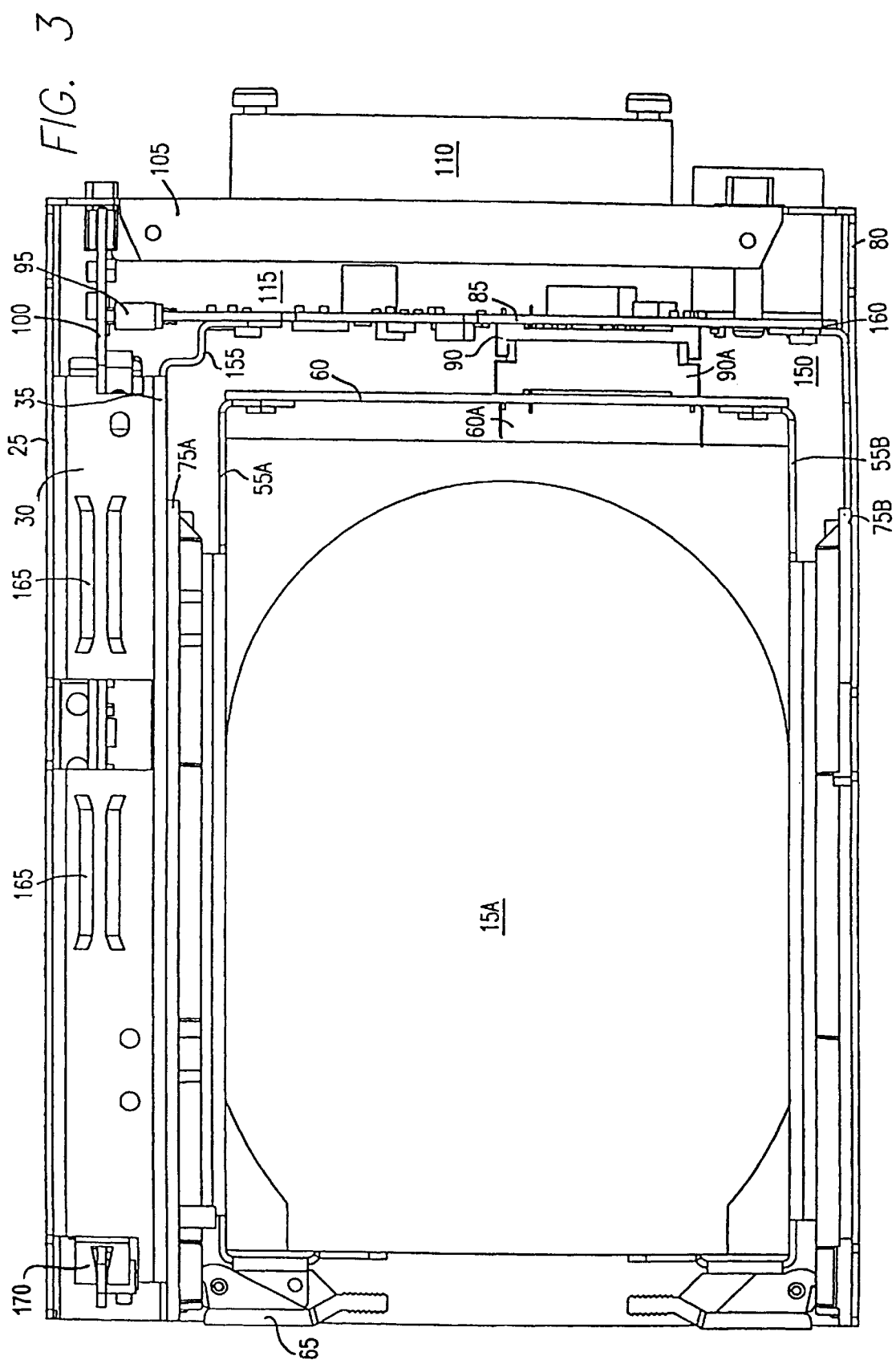
FIG. 3 shows in top plan view the RAID subsystem of the present invention with the top cover removed.

Still referring generally to FIGS. 1–8 and with reference particularly to FIG. 3, the arrangement of the disk drives 15A–C and their connection to the backplane 85 can be better appreciated. The drives 15A–C (only drive 15A is shown in FIG. 3) are latched into the case 25 by virtue of latching mechanism 65, which urges the connector 90A affixed to the drive extension board 60 into mating contact with the connector 90 on the backplane 85. It will be appreciated that the drive extension board 60 is spaced somewhat behind the drive 15A to permit, among other things, variations in the length of the drives 15A–C and also to provide an airflow chamber. Likewise, the spacing of the connectors 90 and 90A creates an airflow chamber 150 between the drive extension board 60 and the backplane 85. The drive 15A can be seen to be connected to the drive extension board by a flexible ribbon cable 60A, visible here but better seen in FIG. 9. The ribbon cable 60A connects to the IDE connector included with the drive 15A, and allows for slight variations in the location of the connector on different types of drives.

The backplane 85 is affixed to the case 25 by virtue of an upper and lower pair of mounting brackets 155 (at the left) and another pair 160. The mounting brackets 155, which are, in an exemplary embodiment, integrally formed with the internal side wall 35, may be seen to be double bent. Mounting brackets 160 may be seen to be affixed to the sidewall 80. While not necessary in many cases, the additional resiliency offered by the double bend in mounting bracket 155 aids in absorbing the deflection forces imposed on the drive and the backplane by the insertion and removal process. In addition, the resiliency of the mounting brackets and the backplane, as well as the ribbon cable 60A, are believed helpful in isolating the drives from any vibration imposed by the fan, the remaining drives or elsewhere in the system. The combination is believed helpful in increasing the reliability of the system and extending the life of the drives. In at least some instances, the flexibility of the backplane 85 and the drive extension board 60, together with the ribbon cable 60A, will be sufficient to provide adequate resiliency and isolation.

The plenum chamber 115 may also be appreciated from FIG. 3, and can be seen to form a decompression space in front of the fan 110. The plenum chamber 115 collects air drawn around the drives 15A–C through cavity 40 and collected in cavity 150 as well as air drawn past the RAID controller board 100 through cavity 45. The spacing between the backplane 85 and rear cover plate 105 can be adjusted as necessary to optimize the efficiency of the fan 110 in drawing air through the RAID array and maintaining the array within an acceptable thermal range.

For ease of manufacturing, the RAID controller board 100 is slidably mounted within the cavity 45. Two pairs of guides 165, which may be formed unitarily with the top wall 30 by being punched downward essentially to form a slot, position the top edge of the board 100 centrally within the cavity 45, in combination with a similar slot (not shown) formed in the bottom of the case 25. A similar guide 170 may also be provided at the front of the wall 30.

Figure 4:
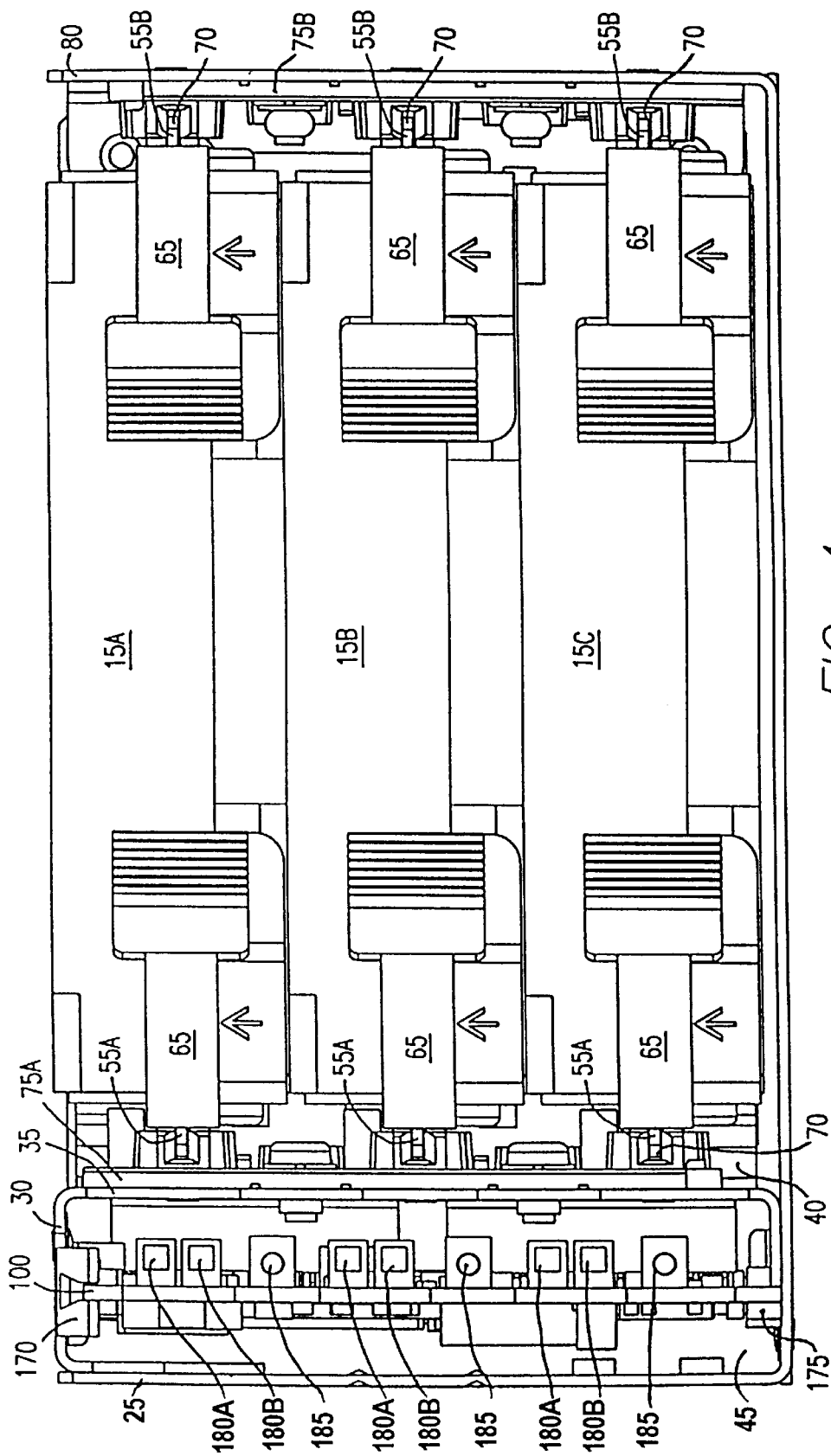
FIG. 4 shows a front elevational view of the RAID subsystem of the present invention with the front cover removed.

Referring next to FIG. 4, the stacking arrangement of the drives 15A–C can be better appreciated as well as the airflow through the cavities 40 and 45. As with FIG. 3, the top cover is not shown. The RAID controller board 100 can be seen to be centrally located in the cavity 45, permitting airflow past either side of the board 100. In addition, the gaps between the mounting blocks 75A–B and the rails 70 can be seen to provide air passages past either side of the drives 15A–C within the cavity 40. By properly sizing the fan 110 and plenum chamber 115 to match the airflow through the cavities 40 and 45, sufficient cooling is provided to the drives and to the RAID controller board to permit long-term continuous operation. It will be appreciated that additional drives may be included in the event thinner drives are used, with commensurate changes to the RAID controller discussed in connection with FIG. 11.

In addition, a leaf spring 175 may be positioned at the front of the cavity 45 both to urge the board 100 into the proper position and also to provide a ground plane connection to the board 100 for discharging any electrostatic charge which might be imposed on the board by the user during maintenance of the array. It will be appreciated that, unlike most subsystems within the computer system, the front edge of the RAID controller 100 will be accessible to the user from the front panel of the computer system simply by removing the bezel 20. As a result, a suitable path to ground for ESD purposes is appropriate, and can be provided by plating with a conductive material a portion of at least one side of the board 100 near its front edge and connecting that plating to the case through the leaf spring 165. The leaf spring is typically constructed of copper or other suitable spring material. Copper plating of such other materials may be desirable in at least some instances. The plating of the board 100 may best be seen in FIG. 10A, where the plating is identified by reference numeral 285.

Further shown in FIG. 4 are a pair of LEDs 180A–B for each drive, together with a pushbutton 185 for each drive. The LEDs 180A typically indicate status of the associated drive and may be multicolor LEDs which use different colors to indicate different operational states. The LEDs 180B typically indicate activity on the associated drive. The pushbuttons 185 are used to signal the RAID controller that the user desires to disconnect the associated drive. By depressing the pushbutton 185, the RAID controller disconnects power and signal paths to the associated drive, allowing that drive to be safely removed while the remainder of the array continues to operate. Once the drive has been electrically disconnected from the array, the drive may be physically removed by virtue of latches 65. That drive or another equivalent drive may then be added back into the array by fastening latches 65. In an exemplary embodiment, insertion of the drive connector 90A into the backplane connector 90 causes the addition of the drive to be sensed by the array; however, in some embodiments the array may be caused to sense the addition of the new drive by again pushing the associated pushbutton 185.

Figure 5:
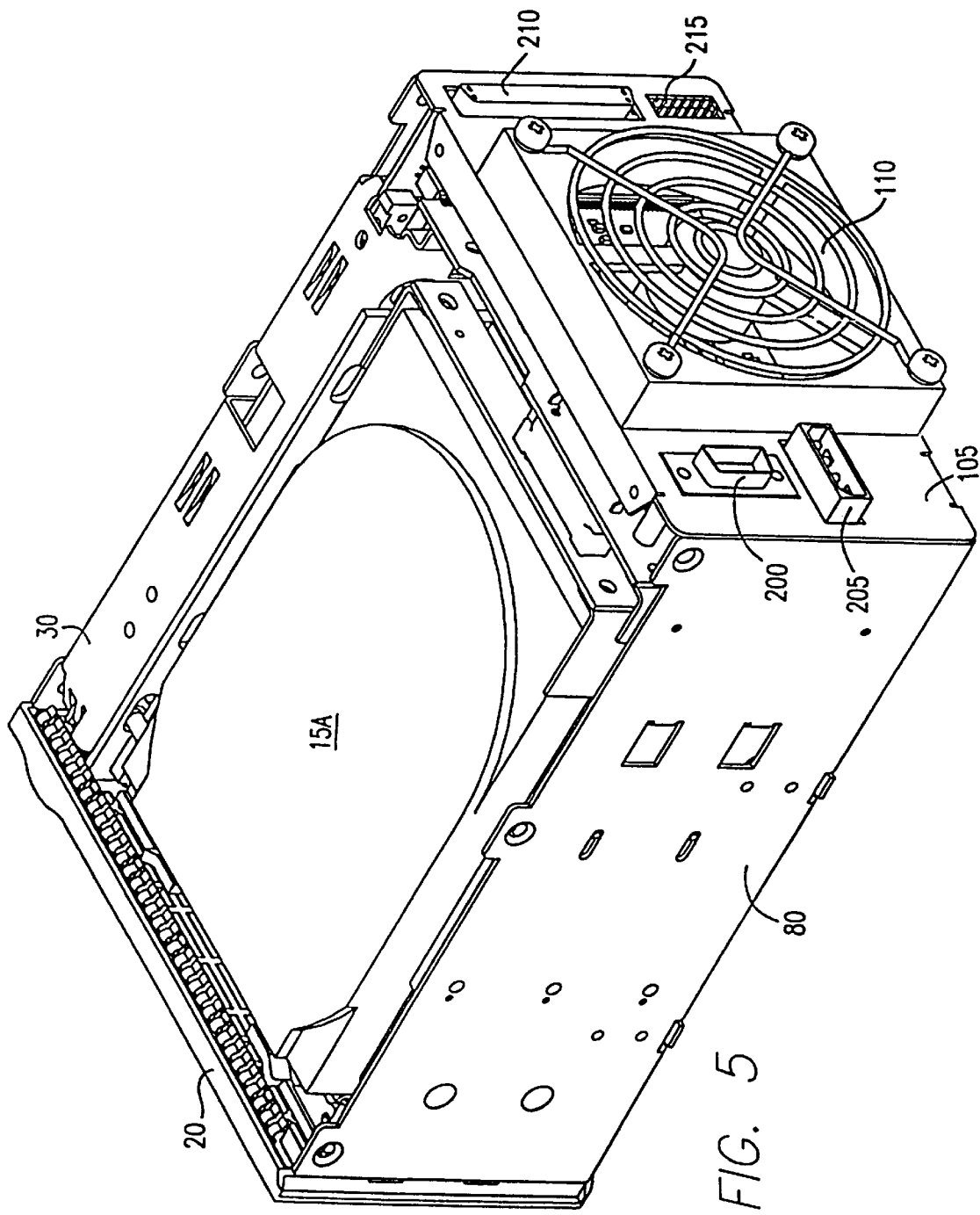
FIG. 5 shows a rear three-quarter perspective view of the subsystem of the present invention with the top cover removed.

With reference next to FIG. 5, the rear portion of the subsystem can be seen in a top three-quarter perspective view, such that the cooling fan 110 and external connectors for connecting the subsystem to the host can be better appreciated. As discussed in connection with FIG. 3, the cooling fan 110 is positioned centrally behind the backplane and spaced therefrom sufficiently to avoid unacceptably turbulent airflow through fan, which increases the amount of airflow past the drives and printed circuit boards and therefore optimizes the cooling effects of the fan. At the left of the fan 110 is positioned a nine-pin D-shell connector 200, typically used to connect to a monitoring device such as the ArrayView product offered by the assignee of the present invention or other suitable device for monitoring the status of the subsystem. Below the D-shell connector 200 is a conventional power connector 205. The D-shell connector 200 and the power connector 205 are, in the exemplary embodiment described herein, connected to the backplane 85 and extend through openings in the rear cover plate 105. At the right side of the fan is a high density connector 210 conforming to the single-ended Ultra-Wide SCSI standard, together with a suitable jumper block 215 for setting the ID of the unit, performing various diagnostics, and other conventional functions. The connectors 210 and 215 are typically affixed to the RAID controller board 100, and extend through openings in the rear cover plate 105. The SCSI connector 210 typically provides the interface to the host system, and the entire subsystem appears as a single SCSI device to the host adapter in the host system. In other embodiments, the subsystem may comply with different interface standards such that different connectors may be offered, including differential SCSI, wide SCSI, or some other interface.

Figure 6:
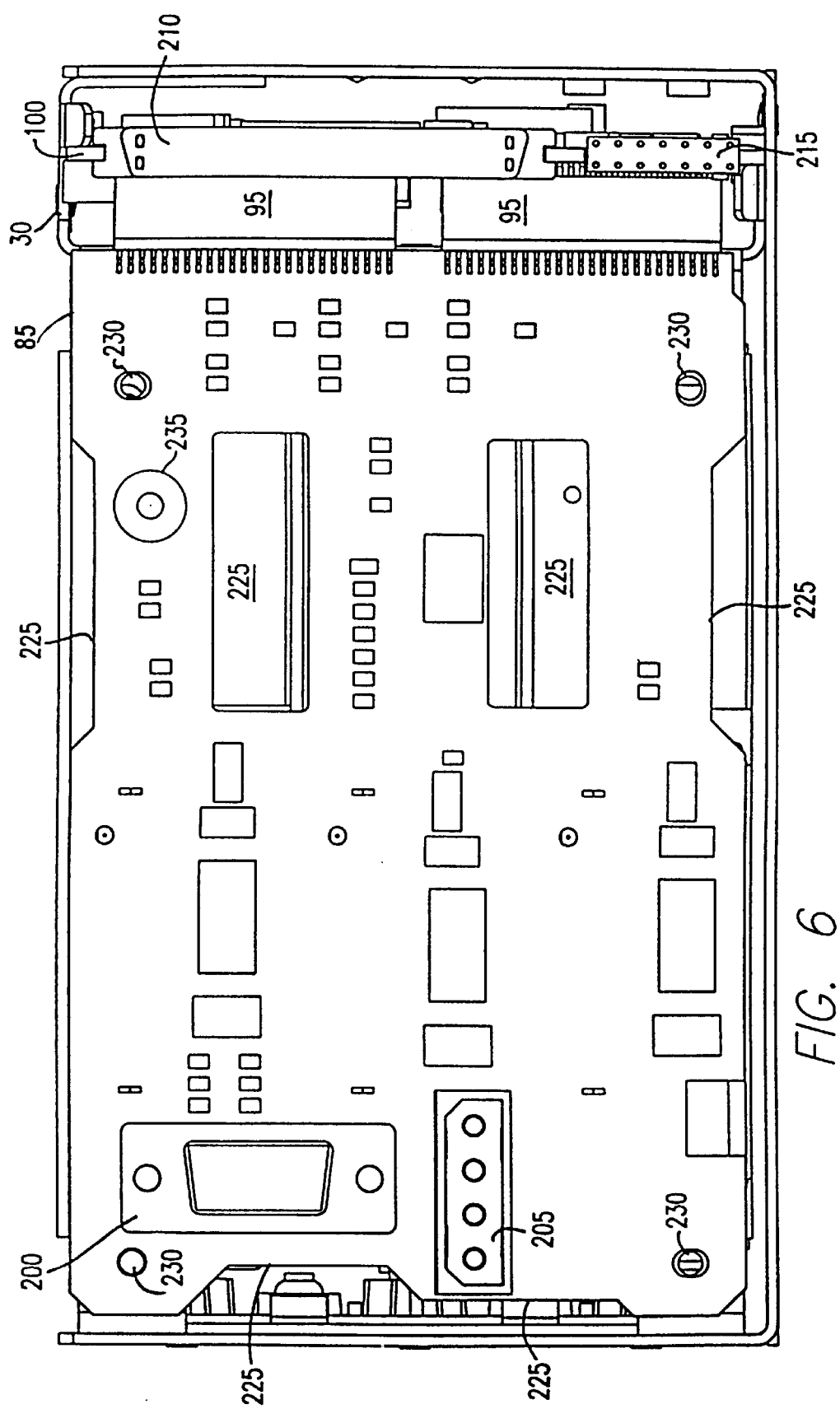
FIG. 6 shows a rear elevational view of the subsystem of the present invention with the rear cover plate removed, and in particular shows the backplane.
Figure 7:
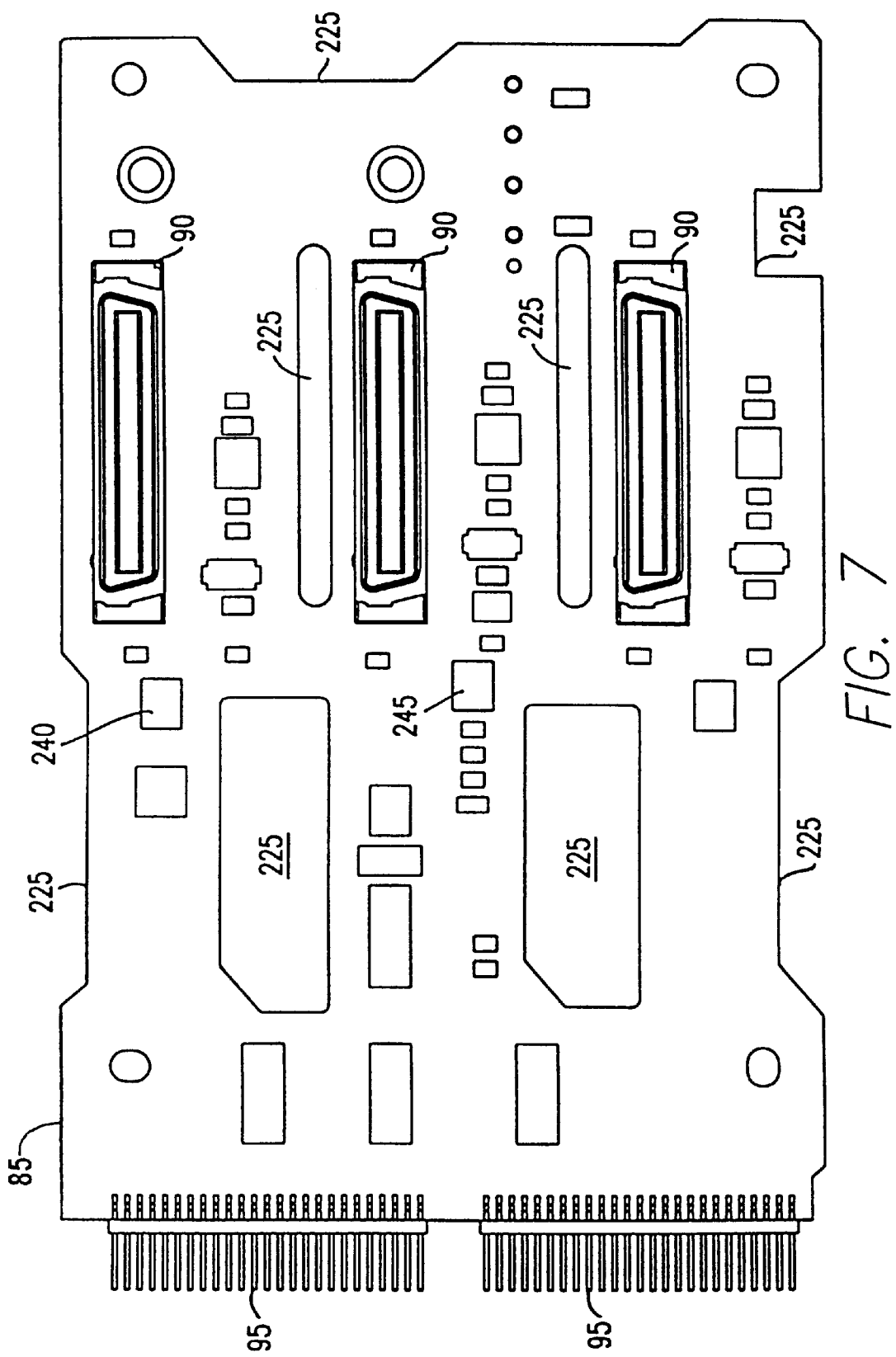
FIG. 7 shows in front elevational view the layout of the backplane of the present invention.

Reference is next made to FIG. 6, which shows the array subsystem in rear elevational view with the rear cover plate (including the fan) removed and thus shows in detail the layout of the back of the backplane 85, and FIG. 7, which shows in front elevational view the layout of the backplane 85. With particular reference to FIG. 6, the connectors 200 and 205 can be seen to be integral with the backplane 85, and the manner by which the dual connector 95 connects the backplane 85 to the RAID controller board 100 can also be seen. In addition, a variety of vents or cutouts 225, both at the periphery and through the backplane 85, can be seen to exist in the backplane to improve airflow into the plenum chamber 115. The backplane is held in place by four screws (not shown) which pass through holes 230 and mount into the mating pairs of mounting brackets 155 and 160. Also mounted on the backplane 85 is an alarm 235 which responds to signals from a variety of sensors which monitor array performance, including for example one or more drive temperature sensors 240, a fan sensor 245, and so on, which in the exemplary embodiment shown herein may be mounted on the front of the backplane as shown in FIG. 7. In addition, the connectors 90 shown on the front of the backplane are typically high cycle, low insertion force connectors which provide both a conventional IDE bus and power to the associated drive. The drive extension 60 then provides the appropriate mechanical interface to the drives, including conventional IDE connectors and conventional power connectors. Although the particular ordering of the drives 15A–C which plug into the connectors 90 is not critical, in the exemplary embodiment described herein the drive associated with the top connector is typically assigned drive 0, the middle connector drive 1, and the bottom connector drive 2.

Figure 8:
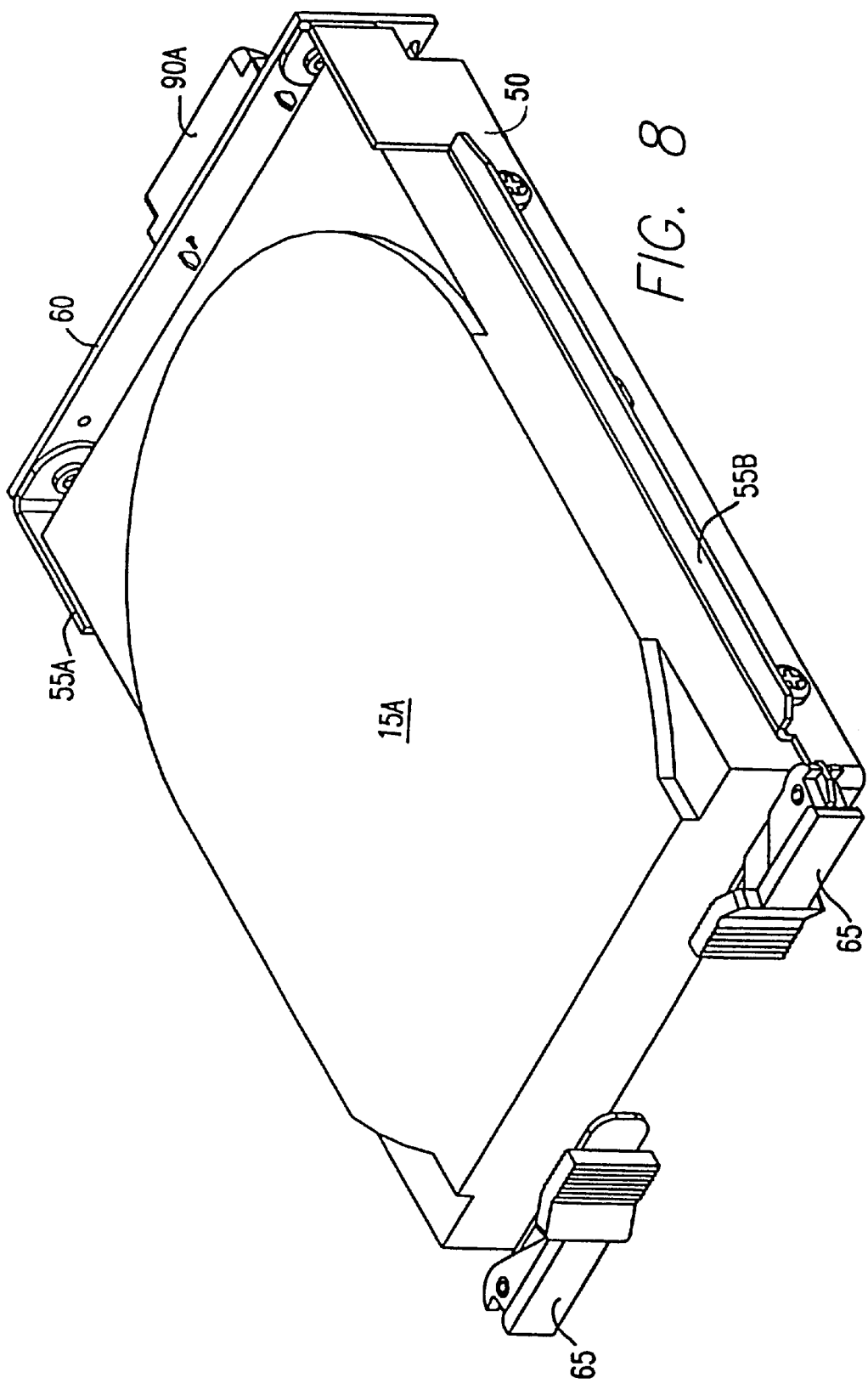
FIG. 8 shows in top three-quarter perspective view a single drive and associated mounting bracket with backplane interface board.
Figure 9:
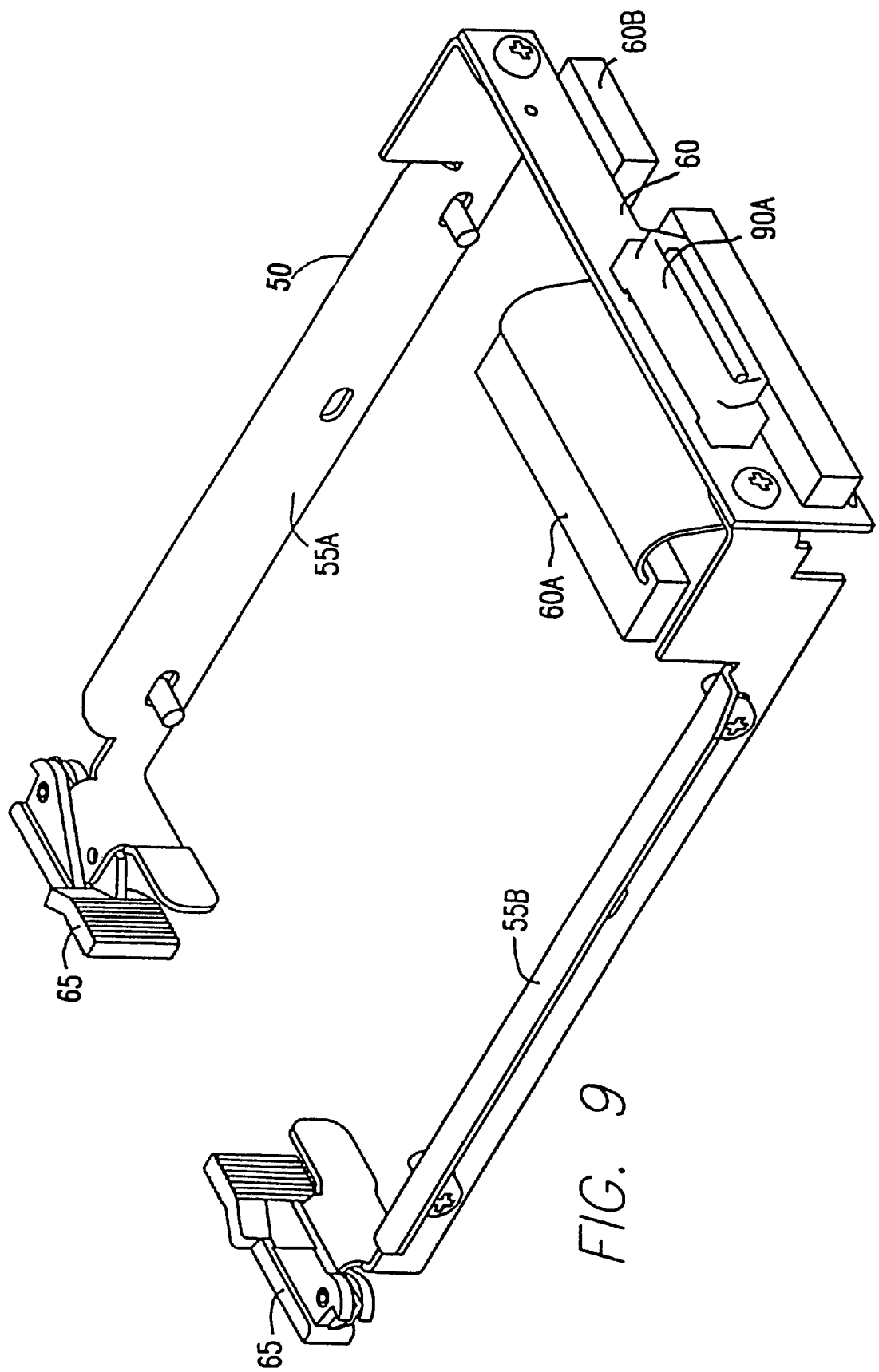
FIG. 9 shows in perspective view the drive mounting bracket of FIG. 8, and in particular shows the ribbon cable interface between the drive and the bracket.

Referring next to FIGS. 8 and 9, the manner by which a single drive 15A fits into a drive bracket 50 can be better understood. The drive bracket 50 comprises, as noted above in connection with FIGS. 1 and 2, a pair of rails 55A–B together with a drive extension board 60. The drive 15 is mechanically affixed to the bracket 50 by means of conventional machine screws, and electrically connects to the bracket through the cable 60A and the connector 90A to the backplane connector 90, as well as through a conventional Amphenol power connector 60B. The latch mechanisms 65 may also be appreciated.

Figure 10A:
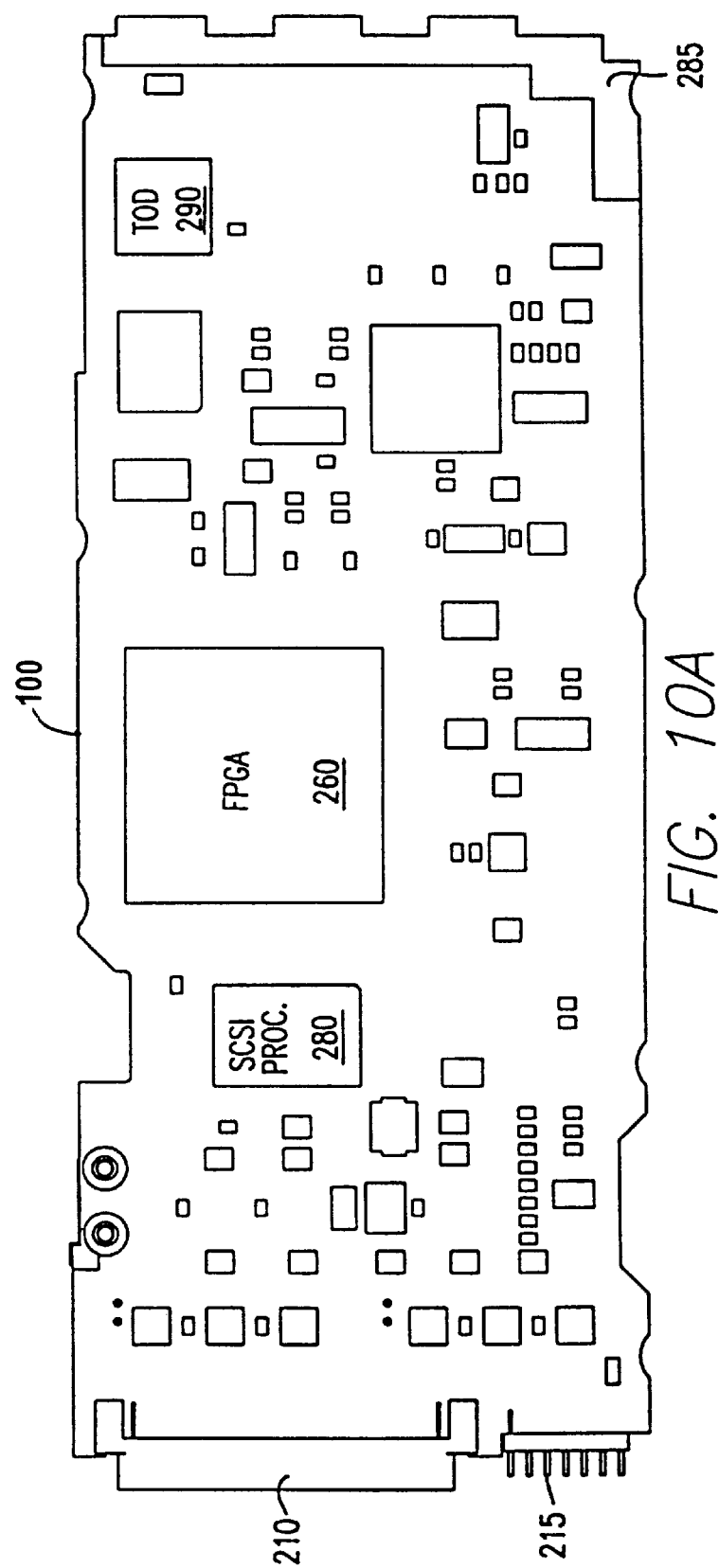
FIG. 10A shows in layout form one side of the RAID controller board.

Referring next to FIGS. 10A and 10B, the layout of the RAID controller board 100 may be seen. The RAID controller board 100 comprises a single double-sided printed circuit board, the schematic of which can be better appreciated from FIG. 11, discussed below. Viewed from the side shown in FIG. 10A, which can be seen to be the outboard side, the connectors 210 and 215 may be seen at the far left. The RAID controller includes a RAID engine integrated circuit 260 (which may be either a Field-Programmable Gate Array, an ASIC or other suitable implementation), to perform the necessary queuing and DMA functions. The RAID engine 260 communicates with cache memory 265 (FIG. 10B), a RISC CPU 270 for managing the operation of the RAID controller, its associated CPU memory 275 (both FIG. 10B), and a SCSI processor 280 (FIG. 10A) for managing the host interface. The LEDs 180A–B and pushbuttons 185 can be seen to be connected to the RAID controller board at the forward edge (FIG. 10B) while on the opposite side of the board the conductive ESD plating 285 (discussed generally in connection with FIG. 3) may be seen. The exemplary embodiment of the RAID controller board 100 shown herein also includes a pair of connectors 276 for permitting the backplane 85 to be connected into the board 100. A time of day/date chip 290 may also be provided as well as various other sensors and logic which perform conventional functions as described in connection with FIG. 11. From the arrangement of the plating 285, it will be particularly appreciated from FIG. 10A that a user performing maintenance on the subsystem of the present invention is substantially prevented from damaging the RAID controller as the result of any electrostatic charge the user may carry when performing otherwise acceptable maintenance, because the plating 285 is connected directly to the ground plane as discussed above.

Figure 11:
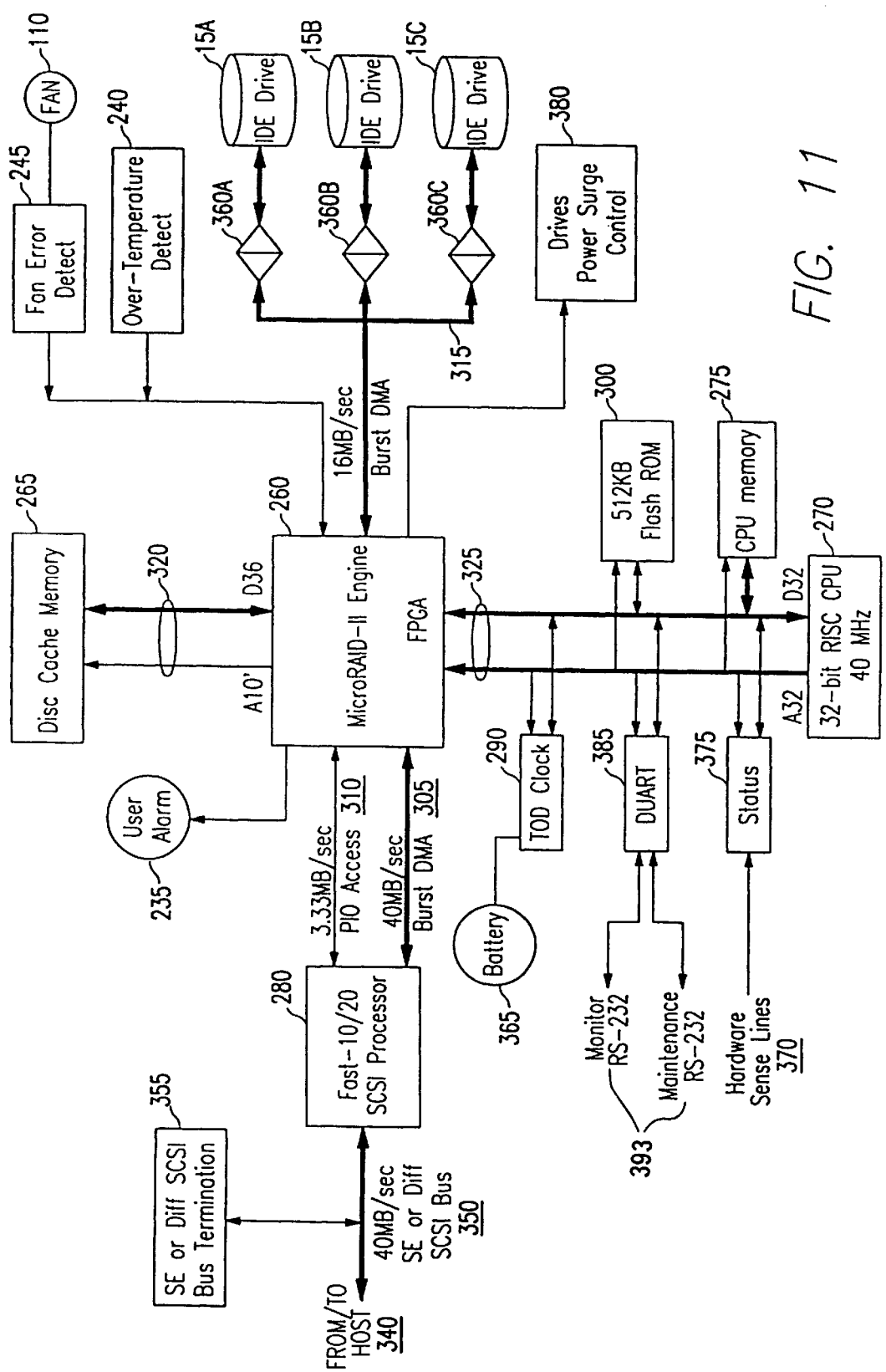
FIG. 11 shows in schematic block diagram form the RAID controller of the present invention including the RAID engine.
Figure 12:
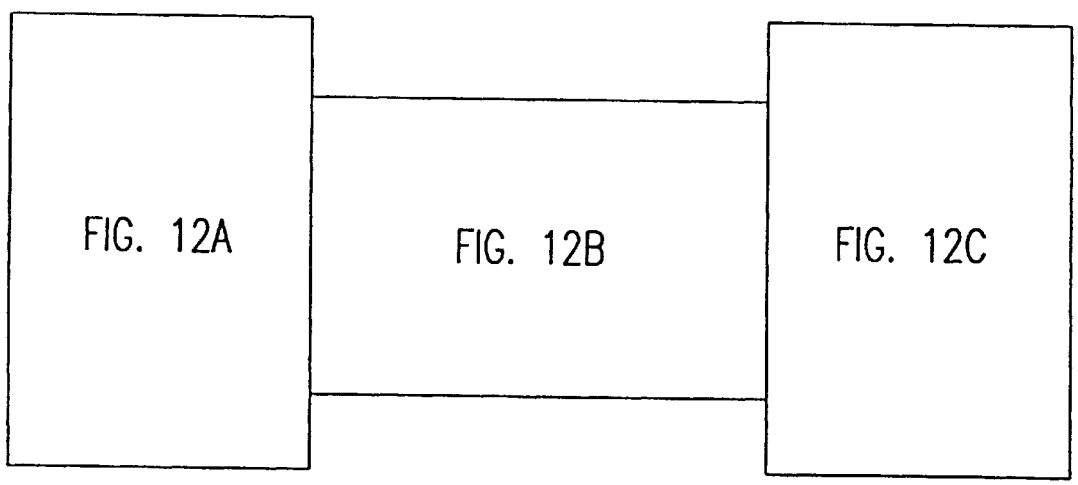
FIG. 12 shows the relationship of FIGS. 12A, 12B, and 12C which show the internal configuration of the RAID engine of FIG. 11.
Figure 12A:
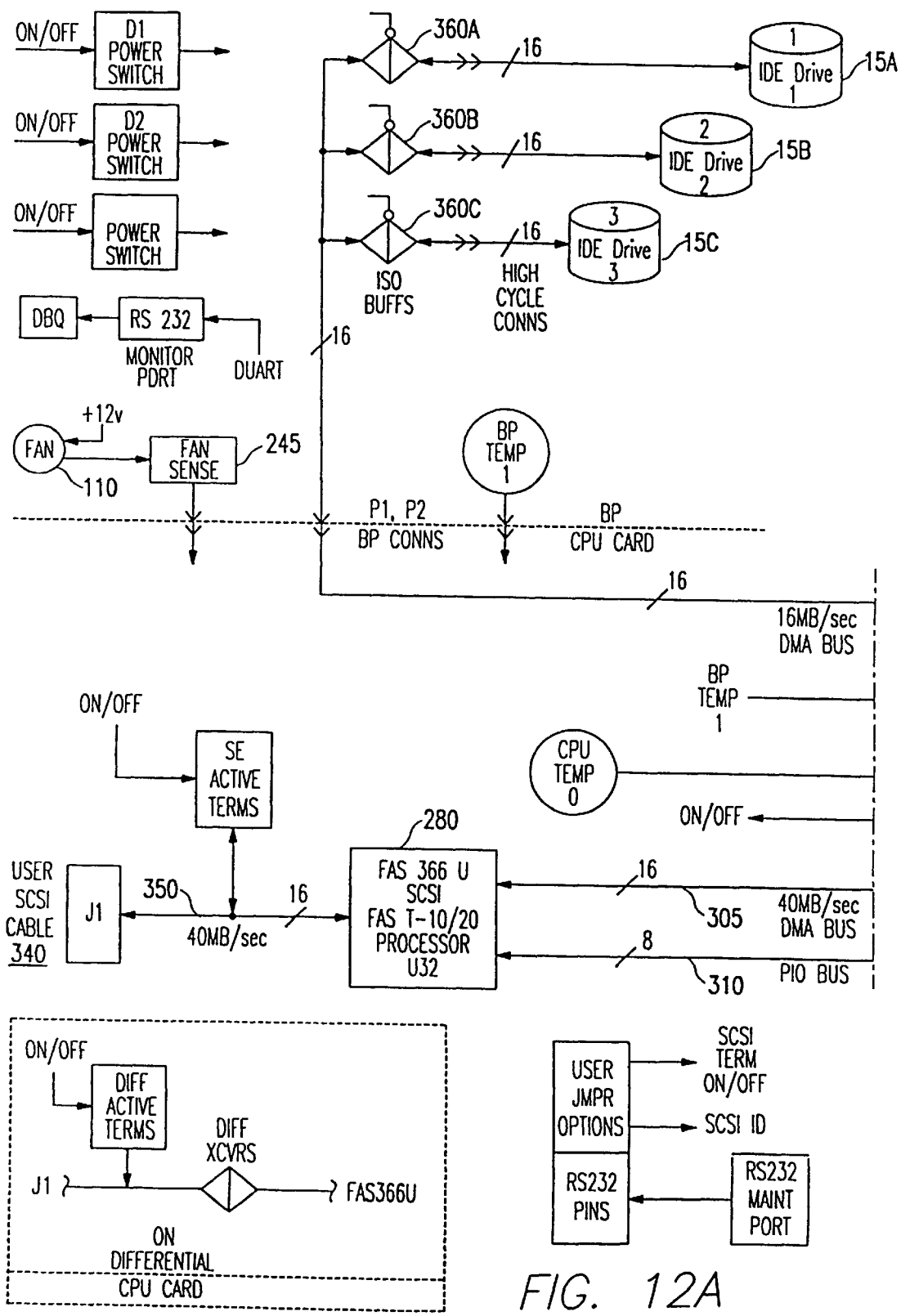
Figure 12B:
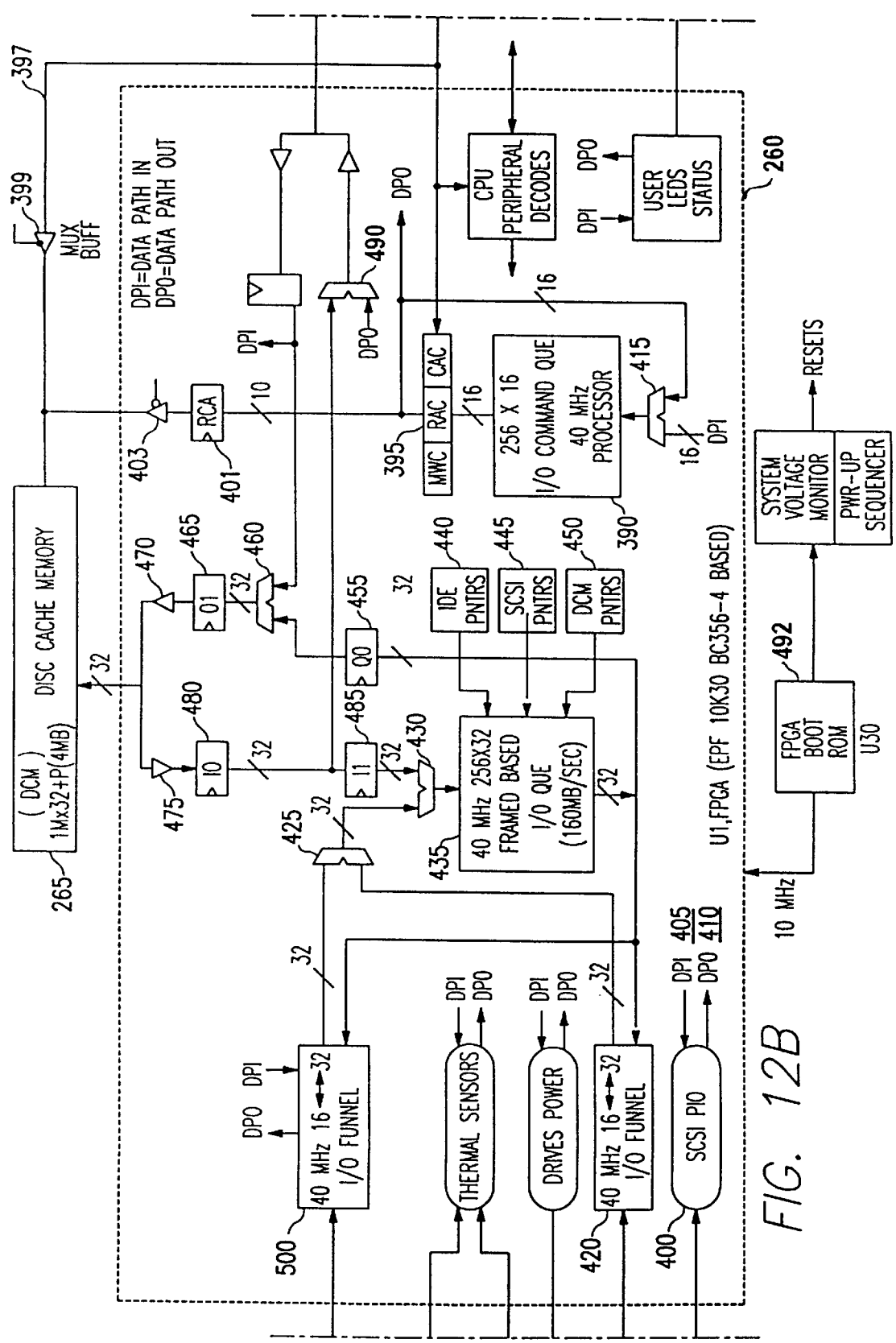
Figure 12C:
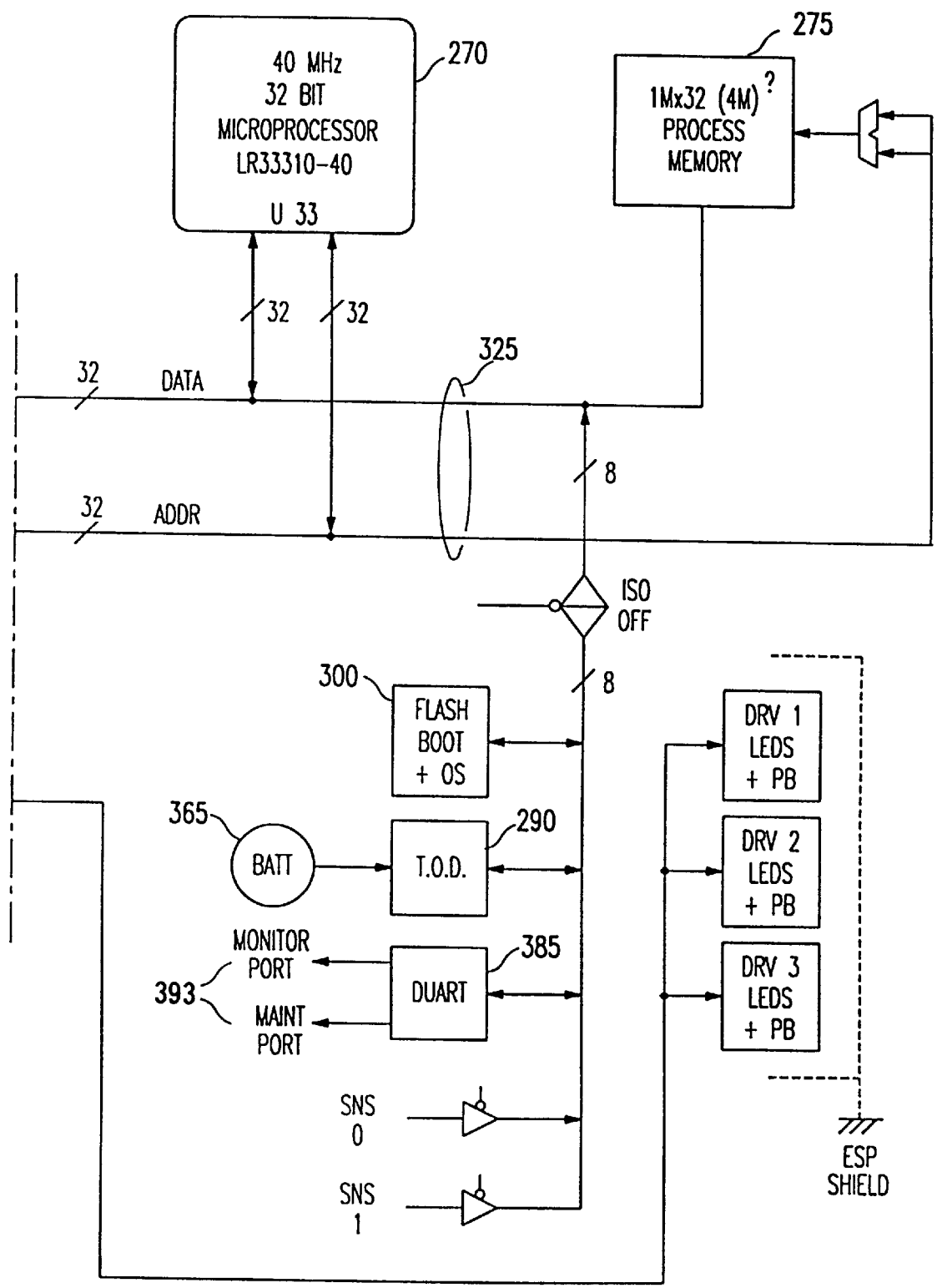

Referring next to FIGS. 11 and 12, the electrical operation of the invention may be better understood. In general, the RAID subsystem appears to the host system as a single volume which externally complies with conventional SCSI commands, but internally operates as a full RAID array. The RAID array operation is controlled by the RAID controller, which in turn operates by using time-division multiplexing and separate 32-bit DMA and CPU software process memory to allow for simultaneous non-contending activities at the engine's peak rate. The DMA or cache memory 265, which may for example be four megabytes configured as 1×36 memory, provides a single-cycle paged EDO pipeline with bandwidth on the order of 160 MB/sec. The CPU memory 275, which may be configured in an exemplary embodiment as four megabytes configured as 1×32, provides a two-cycle paged EDO pipeline with 80 MB/sec bandwidth.

The CPU 270, which may for example be an LSI LR3331040 32-bit RISC processor operating at 40 MHz, cooperates with a FLASH ROM 300 which stores an embedded RAID operating system. At the center of the architecture is the RAID integrated circuit 260, which may for example be an Altera Field Programmable Gate Array or equivalent or may be configured as an ASIC, which provides command queues for each DMA I/O channel, manages the various data I/O queues, manages the bus activities on the key buses associated with it, and supports system peripheral functions. Five major buses are associated with the FPGA 260: a 40 MB/sec, 16-bit SCSI processor bus 305 (typically configured for Ultra-SCSI operation although other SCSI protocols can be supported); a 3.33 MB/sec 8-bit SCSI chip pipelined I/O bus 310; a 16 MB/sec 16 bit IDE drive bus 315; a 160 MB/sec 36-bit disk cache memory (DCM) bus 320; and an 80 MB/sec 32-bit CPU bus 325. The FPGA 260 is configured to permit operation of all five buses in parallel, with the RAID engine 260 operating at a sufficient speed to multiplex the access to the RAID engine 260 by the SCSI processor bus 305, the IDE bus 315, and the DCM bus 320 by allocating, within a defined cycle, one time slot for each of the SCSI processor bus 305 and the IDE bus 315, and two time slots for the DCM bus 320. In the exemplary embodiment discussed herein, a complete cycle may be on the order of 100 ns, with each of the four time slots allotted 25 ns. Because of the performance of the RAID engine 260, the net subsystem throughput is primarily dependent on four factors: the performance of the IDE drives, the RAID function overhead in the embedded operating system, the performance of the user's host adapter, and the driver overhead of the user's host application.

Still referring to FIG. 11, the operation of the system is substantially as follows: On power-up, the system comes to a stable state by loading the operating system from the Flash ROM 300 into CPU memory 275 associated with the RISC processor 270 and initializing the remainder of the system to known states. At some point after initialization, a request either to read or to write will be received from the host system 340 at the host SCSI bus 350, which may be terminated by a termination block 355 if appropriate. The request is then handled by the SCSI processor 280, which sends the appropriate signals to the RAID Engine 260 over a pipelined I/O bus 310 and receives back the appropriate confirmation signal. The data is then made available by the host system over the SCSI DMA bus 305. At this point the Disk Cache Memory 265 is empty. If the request is to write information, the CPU 270 instructs the RAID engine 260 to pass the data to the DCM 265, where it can be maintained in cache. Thereafter, during background processing, the data can be written to assigned disk(s) as appropriate (in accordance with the RAID striping being used) by first having the data accessed by the RAID engine 260 over the bus 320 and written out over the IDE bus 315 to ISO disk buffers 360A–C. The data is then written to the specific disks 15A–C. It will be appreciated that the bus 320 comprises, in the exemplary system described herein, ten address lines and 36 data lines. Likewise, the bus 325 comprises thirty-two address lines and thirty-two data lines. The process ends with a confirmation signal supplied from the RAID engine to the SCSI processor 280 and thence to the host 340. The timing of the various events will be discussed in greater detail in connection with FIGS. 12 and 13.

In a read operation, the process is substantially similar, though somewhat reversed. The process begins by enabling the SCSI interface to be active, typically done at startup. The host then sends a confirmation/acknowledge signal and executes a set-up, followed by sending a request for specified data over the PIO bus 310. The request is then detected by RAID engine 260, which passes it to the drives The data is returned from the drives to the RAID engine 260, where it is passed to the disk cache memory 265 for interim storage. At the appropriate time, the CPU 270 causes the data to be read from the DCM 265 via the bus 320 and passed through the engine 260 to the SCSI processor 280 over the data bus 305. The data is then passed from the SCSI processor 280 to the host over the bus 350.

In addition to its data handling functions, the RAID engine also manages a number of peripheral housekeeping functions. Included among these are monitoring of the over-temperature detector 240 and the fan error detector 245, generating alarm signals (when appropriate) at the alarm 235. The time-of-day/date clock 290 is also monitored, for which power is supplied by a battery or other power source 365 when the system is off. Hardware sense lines 370 can be monitored by means of status registers 375. Power surge control for the drives can be monitored at buffer 380. Monitoring of the subsystem is also provided over a duart 385. Typical monitoring is performed over RS232 links 393 for both monitoring and maintenance.

Referring next to FIGS. 12, 12A, 12B, 12C, and 13, the details of the operation of the RAID engine 260 can be better appreciated, including the timing by which the signals on the various buses are multiplexed by the RAID engine. As with the prior figures, like elements have been assigned like reference numerals from FIG. 11.

As before, when the host system is turned on, the RAID subsystem 10 initializes and the RISC CPU 270 generates a series of enabling factors as established by the software maintained in the FLASH ROM 300. The enabling factors place the IDE drives in known states and also place the SCSI processor 280 in an active and enabled state, including notifying the host system 340. The host system confirms and acknowledges the notification from the SCSI processor. In addition, the enabling factors place the RAID engine 260 in a known state, and in particular initialize a 40 MHz I/O Command Queue Processor 390 which is internal to the RAID engine 260.

After initialization, the host system sends data to be written to the drives 15A–C, as before. The information, which comprises header information and data, is supplied to the SCSI processor 280 over the bus 350. After processing by the SCSI processor 280, the header information is supplied to the RAID engine 260, indicated by the dashed line in FIG. 12B, over the eight-bit programmable I/O bus 310. The header information is supplied to the RAID engine 260 through a SCSI PIO 400, which has a data path in 405 and a data path out 410. The data path in 405 links to a one side of a mux 415, which in turn feeds, indirectly, the input to the I/O command queue processor 390. The I/O command queue processor 390 is a frame-based script processor and supplies half-word commands, row address commands and column address commands to a register 395 via a 16-bit bus. The register 395 can also receive addresses from the RISC processor 270; the processor 270 can also supply addresses to the DCM 265 via a 10-bit branch 397 of the bus 325, fed through a mux buffer 399. The output of the register 395 can be supplied via a multiplexed 10-bit bus (addressing one megabyte of address space) to the DCM 265 through a pipeline register 401 and buffer 403. The output of the register 395 provides, indirectly, the data-path-out referred to elsewhere in connection with the RAID engine 260, including the second input to the mux 415.

Concurrently with the header information supplied from the SCSI processor 280 to the SCSI PIO 400 on the bus 310, the data from the SCSI processor 280 is supplied to the RAID engine 260 via a sixteen-bit DMA bus 305. In particular, the data is fed to a 16-bit-to-32-bit funnel 420, operating at 40 MHz, because the RAID engine 260 operates internally at 32-bit width. The data is supplied to one side of a funnel mux 425 and then to one side of a I/O queue mux 430. The output of the queue mux 430 is supplied to a frame-based I/O queue 435, operating at 40 MHz and configured at 256×32 to provide 160 MB/sec throughput. Other inputs to the I/O queue 435 include various IDE pointers 440, SCSI pointers 445 and DCM pointers 450. The data is clocked through to the output of the I/O queue 435 and supplied to a first pipelined output register 455, and then to one side of a DCM mux 460. The output of the mux 460 is provided to a second pipelined output register 465, through a buffer 470 and then out of the RAID engine 260 to the DCM 265.

The data is stored in the DCM 265 until appropriate for writing to appropriate ones of the disks 15A–C, typically determined by the RAID operating system according to conventional algorithms. At that time, the I/O command queue 390 issues a command to write the data to the disk drives. The data is supplied by the DCM 265 to a buffer 475 and then to a pipelined input register 480. The data is then provided to a second input register 485 as well as one side of a processor input mux 490. To write to the drives, the data is fed through the register 485 to the other side of the mux 430, and then to the I/O queue 435.

The data out of the I/O queue 435 is provided to the SCSI I/O funnel 420, but is also provided to a disk I/O funnel 500. The disk I/O funnel 500 reconverts outgoing data from a 32-bit data width to a 16-bit data width for communication with the disk drives 15. The remainder of the communication to the disk drives is as described in connection with FIG. 11.

Retrieving data from the RAID subsystem is the other operation typically required of the RAID subsystem 10 by the host system 340. Retrieving data is initiated from the host system 340, which again supplies the host's request to the RAID engine 260 via the PIO bus 310, the SCSI PIO 400, and then the data-path-in 405 to the I/O command processor 390 through the mux 415. The I/O command processor 390 then supplies the appropriate RAC/CAC addresses via the register 395 to cause the data to be retrieved.

The appropriate addresses for the data desired by the host system are supplied to the DCM 265. If the data is maintained in the DCM 265, it is supplied via the registers 480 and 485 to the mux 430 and then to the I/O queue 435. From the I/O queue 435 the data is supplied to the SCSI I/O funnel 420 where the outgoing data is converted to 16-bit width. The data is then supplied on the DMA bus 305 to the SCSI processor 280, and finally out to the host 340 over the bus 350.

However, if the data requested by the host is not currently maintained in the cache 265, the data must be requested from the disks. In this instance, the addresses for the requested data are supplied via the registers 480, 485 and mux 430 to the I/O queue 435. The output of the I/O queue 435 is then supplied to the disk I/O funnel 500 and out to the drives 15A–C. The data is then retrieved from the drives after the required latency, after which the data incoming from the drive is converted from 16-bit width to 32-bit width in the disk funnel 500. The output of the funnel 500 data is then supplied to the second side of the mux 425, and from there to the I/O queue 435 through the second mux 430.

The output of the I/O queue 435 is then fed through the 110 funnel 420 in the same manner as described above for outgoing data, with the result that the data is supplied to the host system in the conventional manner. For implementations based on a field programmable gate array (FPGA), an FPGA boot ROM 492 may be provided to personalize the FPGA upon power-up. In ASIC or other gate array implementations, such a boot ROM is not necessary. Likewise, the RAID OS is loaded into CPU memory 275 upon power-up, and all software control is derived from the instructions stored in the CPU memory.

A key feature of the operation of the present invention is that a single RAID engine 260 is able to manage the multiple DMA queues necessary to communicate with the SCSI processor, the disks, and the processor 270. This objective is achieved by time multiplexing the key buses which provide data to the RAID engine 260. This is possible because the I/O queue operates at an effective rate of 160 MB/sec, compared to the other devices which operate at no more than 40 MB/sec. This allows the RAID engine to allocate approximately one fourth of its time to each of the SCSI processor and disk drives, and to allocate approximately one-half its time to DMA addressing. Shown as FIG. 13 is a timing diagram which provides the phased accessing necessary to provide the time division multiplexing important to some aspects of a presently preferred embodiment of the invention.

In particular, the 40 MHz clock of the I/O queue 435 and script processor 390 is shown at 600, while the SCSI Phase for access to the RAID engine is shown at 605. The IDE phase is shown at 610, while the DCM phase is shown at 615. In an additional feature, in the event that a cycle occurs when no access is requested from the IDE drives, the phase is reassigned for use by the DCM. Similarly, for those cycles in which the SCSI processor requires no I/O access the phase allocated for the SCSI processor is reassigned to the DCM. It will thus be appreciated that extremely high throughputs can be achieved with the present design.

Referrring next to FIG. 14, the hot-swapping arrangement of the present invention—by which one or more drives may be removed while the remainder of the array continues to operate—may be better understood. In particular, in the event the user desires to remove one of the drives 15A–C, for example due to the failure of a drive, the user actuates pushbutton switch 185 associated with the drive to be removed. This signals the CPU 270, which operates under software control to signal the FPGA control logic to power down both the 12 volt and 5 volt supplies 700 and 705, respectively, of the associated drive. In addition, the data path 710 and control path 715 are caused by the processor to be electrically disconnected from the remainder of the subsystem. At this point, the user can readily undo the latches 65 and remove the necessary drive.

To reinstall the drive, the user simply reverses the mechanical portion of the process by inserting the drive into the drive bay and latching the latches 65. A bistable latch senses the reinsertion of the drive, and signals the CPU 270 to reapply both power and signal connections to the newly-installed drive. In this manner the old drive may be removed and the new drive installed.

It can therefore be appreciated that a new and novel system for a RAID array subsystem and highly integrated controller has been described. It will be appreciated by those skilled in the art that, given the teachings herein, numerous alternatives and equivalents will be seen to exist which incorporate the invention disclosed hereby. As a result, the invention is not to be limited by the foregoing exemplary embodiments, but only by the following claims.

We claim:

1. A mass storage array subsystem comprising:

a plurality of storage devices;

a backplane adapted to couple to said plurality of storage devices;

a controller having a first interface to couple to a host system and a second interface adapted to couple to said backplane to communicate with said plurality of storage devices;

a first cavity housing said controller; and a second cavity housing said plurality of storage devices, said second cavity adjacent to said first cavity and coupled to said backplane wherein said controller further comprises a conductive material on a portion of said controller to provide a path to ground for electrostatic discharge protection.

2. A mass storage array subsystem comprising:

a plurality of storage devices;

a backplane adapted to couple to said plurality of storage devices;

a controller having a first interface to couple to a host system and a second interface adapted to couple to said backplane to communicate with said plurality of storage devices;

a first cavity housing said controller; and a second cavity housing said plurality of storage devices, said second cavity adjacent to said first cavity and coupled to said backplane wherein said controller further comprises a switch for each said storage device to signal to said controller to disconnect power and signal paths to respective said storage device to allow a hotswap.

* * * * *